United States Patent
Garcia et al.

(10) Patent No.: US 12,382,949 B2
(45) Date of Patent: Aug. 12, 2025

(54) BIRD REPELLENT SYSTEM

(71) Applicant: ROBOTX ELETRÔNICOS LTDA-EPP, Botucatu (BR)

(72) Inventors: Cleber da Cruz Garcia, Botucatu (BR); Fernando Garcia Monte Junior, São Miguel (BR); Rodrigo da Cruz Garcia, Botucatu (BR)

(73) Assignee: ROBOTX ELETRÔNICOS LTDA—EPP, Botucatu (BR)

( * ) Notice: Subject to any disclaimer, the term of this patent is extended or adjusted under 35 U.S.C. 154(b) by 799 days.

(21) Appl. No.: 17/053,916

(22) PCT Filed: Jan. 18, 2019

(86) PCT No.: PCT/BR2019/050018
§ 371 (c)(1),
(2) Date: Nov. 9, 2020

(87) PCT Pub. No.: WO2019/222822
PCT Pub. Date: Nov. 28, 2019

(65) Prior Publication Data
US 2021/0259236 A1  Aug. 26, 2021

(30) Foreign Application Priority Data
May 25, 2018  (BR) .......................... 102018010680-5

(51) Int. Cl.
*A01M 29/26* (2011.01)
(52) U.S. Cl.
CPC .................................. *A01M 29/26* (2013.01)
(58) Field of Classification Search
CPC .......... H01B 17/00; H01B 17/12; H02G 7/00; H02G 7/18

(Continued)

(56) References Cited

U.S. PATENT DOCUMENTS

| 3,717,802 | A | * | 2/1973 | Plevy | ....................... H05C 1/02 |
| | | | | | 174/117 FF |
| 5,092,088 | A | * | 3/1992 | Way | ..................... A01M 29/32 |
| | | | | | 52/101 |

(Continued)

FOREIGN PATENT DOCUMENTS

| DE | 3914894 A1 * | 5/1989 |
| DE | 202016003093 | 8/2016 |

(Continued)

OTHER PUBLICATIONS

Weber, W. *Pigeon associated people diseases.* Bird Control Seminars Proceedings 21. 1979.

(Continued)

*Primary Examiner* — Peter M Poon
*Assistant Examiner* — Hae Rie Jessica Byun
(74) *Attorney, Agent, or Firm* — The Dobrusin Law Firm, P.C.

(57) ABSTRACT

The present invention belongs to the field of devices to scare away birds in general, preferably gulls, pigeons and vultures using a variable electromagnetic field. More specifically, the invention teaches a system of bird repellence by sensorineural interaction, which works through the formation of an electromagnetic field. The system consists of a pulse generator (1) that is electrically connected to a mesh (2) consisting of a plurality of coils (4) arranged in insulating plugs (22) that induce an electromagnetic field that interacts with the birds' magnetic orientation system.

10 Claims, 5 Drawing Sheets

(58) Field of Classification Search
USPC .............. 174/5 R, 5 SB, 5 SG, 138 R, 135
See application file for complete search history.

(56) References Cited

U.S. PATENT DOCUMENTS

| | | | | |
|---|---|---|---|---|
| 5,255,896 | A * | 10/1993 | Letarte | H05C 1/00 256/10 |
| 5,666,767 | A * | 9/1997 | Ohba | A01M 29/26 116/22 A |
| 5,884,426 | A * | 3/1999 | Ishida | A01M 29/26 116/22 A |
| 5,918,404 | A * | 7/1999 | Ohba | A01M 29/26 116/22 A |
| 6,003,471 | A * | 12/1999 | Ohba | A01M 29/26 119/713 |
| 6,250,255 | B1 | 6/2001 | Lenhardt et al. | |
| 6,880,811 | B2 * | 4/2005 | Burdick | A01M 29/24 256/10 |
| 9,615,567 | B2 * | 4/2017 | Peters | E04B 1/72 |
| 2012/0124918 | A1 * | 5/2012 | Zimmerman | E04D 13/004 52/173.1 |
| 2018/0070556 | A1 * | 3/2018 | Hagen | A01M 29/28 |

FOREIGN PATENT DOCUMENTS

| | | | | |
|---|---|---|---|---|
| EP | 0328866 | A2 * | 1/1989 | |
| FR | 2759545 | A1 * | 8/1998 | ............ A01M 29/26 |
| JP | 2002159254 | | 6/2002 | |
| WO | WO-8404022 | A1 * | 10/1984 | |
| WO | WO-2005013686 | A1 * | 2/2005 | ............ A01M 29/00 |
| WO | WO-2019151875 | A1 * | 8/2019 | ............... A01K 3/00 |

OTHER PUBLICATIONS

Schuller, M. *Pombos Urbanos—um caso de saúde pública*. SBCC, v.19, p. 32-7. 2005.
International Search Report dated Nov. 3, 2019, Application No. PCT/BR2019/050018.

* cited by examiner

BIRD REPELLENT SYSTEM

FIELD OF THE INVENTION

The present invention belongs to the field of devices to scare away birds in general, preferably gulls, pigeons and vultures using a variable electromagnetic field. More specifically the invention teaches a bird repellent system consisting of a pulse generator that is electrically connected to a mesh made up of a plurality of coils arranged in insulating plugs that induce an electromagnetic field that interacts with the bird's magnetic orientation system. Finally, a method for installation of this inductive mesh is revealed.

BACKGROUND OF THE INVENTION

Some birds, such as the pigeon, expose the human being to a diversity of health risks, since they are transmitters of several diseases. In addition, pigeons often bring damage to public and private heritage that includes the degradation of parks, gardens, vehicles, buildings, monuments, statues, among others.

Considering the health risks, pigeons can be the direct cause of transmission of infectious diseases to man, providing the multiplication of numerous species of parasites and can transmit pathogens in rural, residential, and industrial environments.

Since 1979, Weber had already described 57 diseases associated to pigeons, from those that affect only birds to those that infect man and other animals (zoonoses).

The most important diseases for the public health and commonly spread are Cryptococcosis, Salmonellosis, Histoplasmosis. In identified seven more protozoa and six helminths, which had not yet been found in 2003, Schuller urban pigeon excreta, showing that these birds are an important disseminator of diseases.

Cryptococcosis is the main disease transmitted by pigeons, which contaminates people through the inhalation of fungi that are present in the feces of this animal. It attacks the lung and can also reach the central nervous system, causing symptoms such as headache, sleepiness and fever. In some cases, it can even cause meningitis.

Salmonellosis is another disease linked to pigeons, it presents the symptoms of a food poisoning, mainly of contaminated meat. It causes diarrhea and other abdominal pains.

Histoplasmosis is also transmitted by pigeon faeces fungi, causing a very deep mycosis that affects the internal organs. The contamination of the human being occurs by the inhalation of spores.

Ornithosis is an infectious disease caused by bacteria. Contamination of the human being occurs by contact with birds carrying the bacteria or with their waste.

Gulls and pigeons can also carry some microorganisms in their feathers, causing dermatitis if they meet humans. Dermatitis causes a lot of itching, infections and even turn into allergies that affect the respiratory system.

Moreover, these birds have a worldwide presence, being a cause of concern for public health in many countries.

In England, in 1994, an outbreak of Newcastle disease was triggered, caused by a virus. This disease was spread through the release of excreta from urban pigeons that contaminated a batch of poultry feed, resulting in the induced death of 820,000 animals that had been infected.

With regard to the food issue, gulls and pigeons can also cause contamination of food products for human consumption, through the deposition of their feathers and other waste on raw or even packaged food. That is, pathogens can contaminate food at any stage of production until it is consumed. Secondary infestation can occur which would be the appearance of other pests such as flies, mites and coleoptera.

Thus, any place vulnerable to the presence of this bird, such as schools, hospitals, public gardens, industries of the most diverse branches of activity, squares, residences, among others, is subject to contamination by these agents, aided by the spreading characteristic of pigeons.

In relation to the degradation of the patrimony, these birds create a negative image of the infested place and cause accumulation of excreta in linings, roofs, sills, marquises, monuments, among others. Due to the presence of uric acid in the excreta, the surfaces that meet the excreta suffer corrosion, causing microscopic and irreversible cracks, especially in limestone.

In addition, it is common for pigeons to cause sinking or rupture of ceilings of houses, churches, schools, and other constructions.

In view of the various inconveniences caused by pigeons and other birds in general, the inventors started research and development with the aim of keeping birds in general away from a certain locality, without, however, mistreating them.

The research began by seeking the tools available on the market to control and repel birds. However, it soon became evident the great difficulty of the tools available to efficiently repel these animals.

The available resources found on the market are spicules, screens, sticky gel, conceptual use, ultrasound device and scarecrows.

Spicules

The use of spicules has the function of generating a disturbance in the landing of birds. This device works in the first days, but the birds insist to make the nest and as they are structures of little rigidity (malleable), the birds are able to accommodate between them returning to the site, making the spicules a palliative tool for the function.

Application of the spicules is only performed on edges and on structures of small width, making it a limited tool.

Screens

The screens have the function of creating a physical barrier preventing the access of the bird in structure and subsequent nesting. Exposed to the weather, they quickly dry out and break and thus the birds are able to enter through it. Many times, they enter through small holes in the canvas and can no longer get out, becoming trapped, without food or water, the birds end up dying.

Repellent Gel

Sticky material for the landing of birds, created to avoid the landing of doves creating an unpleasant sensation for the birds, but its effectiveness has a very short duration. After a few days exposed to the weather, the dust starts to accumulate on the sticky gel, making its effectiveness to be reduced in a few days.

After being covered with a layer of dust the doves land again on the sticky material. Larger birds such as pigeons, gulls and vultures have the strength to come out of the gel when they are not yet fully covered by the dust layer.

On the other hand, the gel still has an unwanted effect on other small birds (birds) that have the thinner legs and end up penetrating the deepest layer of the gel, the part that is still sticky, causing the apprehension of the small birds and leading them to death by starvation.

Another disadvantageous aspect for the gel is that after being applied on the surface it cannot be totally removed, due to its very sticky characteristic, making a product ineffective and still leaving an undesirable residue of dirt. The other methods are equally ineffective, which motivated the inventors to look for a solution not yet existing.

Initial researches were related to the biology of birds, especially the pigeon. During the studies it was discovered that pigeons have a magnetic peculiarity, the iron crystals (magnetite). In pigeons, iron crystals are located at the upper base of the bird's beak. These crystals are directly connected to the bird's central nervous system, thus making a sensorineural interaction between the iron crystals and the bird's nervous system. It was later discovered that, in fact, iron crystals are present in the bird's beaks in general.

This sensorineural interaction acts directly on the bird's navigation system. Therefore, this navigation system allows birds to travel from one point to another with an excellent degree of orientation. In other words, this biological mechanism serves as a natural compass for the birds, which orient the direction of their flights using the Earth's magnetic field. This biological mechanism guides the birds in the migratory flows allowing them to fly long distances without getting lost.

Thus, most birds can perceive the polarity or inclination, direction, altitude or location of the Earth's magnetic field. Soon their navigation occurs by magnetic orientation.

Considering this important information, the inventors sought the integration of electronics with the birds' biological navigation system. After much research and development, they arrived at an electronic pulse emitting device. In addition, they also developed a magnetic field inductive mesh, which creates a small discomfort in the birds. Gradually, in approximately 10 to 20 days, the discomfort caused by the magnetic field moves the birds away from the proximity of the mesh.

During the research the inventors also sought similar solutions in patent documents, however no invention found in the state of the art was able to solve the problem in such an effective and efficient way. The advantageous effect of the present invention was achieved in view of several characteristics and peculiarities that will now be shown and compared with the prior art patent documents.

PRIOR ART

The patent document DE202016003093, filed on Apr. 13, 2016 and published on Aug. 24, 2016, reveals a device for keeping birds away, particularly for street lamps, which is based on magnetic fields that vary in time and disturb the perception of birds. This invention is disadvantageous because it causes an effect only in the proximity of the lamps, not being an invention that allows a protection of wide spaces. The inductive mesh developed in the present invention has a characteristic of covering large areas for repelling birds.

The patent document JP2002159254, filed on 29 Nov. 2000 and published on 4 Jun. 2002, reveals a device to prevent birds from moving over a certain area. This device can be connected or arranged in an elevated place in the open air. This device comprises a pair of bases and a limb with multiple needles. The multiple needle limb comprises a bar-shaped cylinder as a support shaft and needle-shaped rods having several projections. The bases are provided with permanent ring magnets.

This invention uses a magnetic device only. No electromagnetism is used, as in the present invention.

The American patent document U.S. Pat. No. 6,003,471, filed on Dec. 31, 1997 and published on Dec. 21, 1999, reveals an apparatus to prevent the presence of birds comprising at least three support columns, wire elements extended between adjacent support columns and a plurality of magnet elements arranged in the wire elements.

This apparatus includes an oscillation transmission mechanism for other adjacent wire elements. In this unit, when a single wire oscillates, the other adjacent wire elements also oscillate by means of the oscillation transmission mechanism.

As in the previous document, this American invention only shows the use of permanent magnets, where the oscillation of the magnetic field is carried out by mechanical means and not electromagnetic as taught in the present invention.

SUMMARY OF THE INVENTION

Thus, the present invention teaches a bird repellent system comprising an electronic device that generates alternating electric pulses that is electrically connected to a mesh formed by a wire, the wire being fixed to a plurality of insulating plugs. The shape of the mesh is determined by the positioning of the insulating plugs fixed in a building, being the insulating plugs fixed in a plurality of places in order to provide a variety of mesh geometries suitable to the characteristics of the building, where an electromagnetic field is generated. The electromagnetic field generated by the mesh is intensified by winding the wire around the body of the insulating plug, forming a coil that induces the electromagnetic field capable of repelling birds in the vicinity of the mesh.

The bird repellent system consists of a single coil.

The bird repellent system has an open loop geometry of a "C" or a "U" or preferably a closed loop according to the characteristics of the building.

A bird repellent pulse generator produces an alternating electrical signal at a frequency of 100 to 150 Hz with a voltage of 1,000V to 6,000V, preferably 4,000V and a current of $0.001 \times 10^{-3}$ to $0.01 \times 10^{-3}$ amperes, being the waveform generated the sawtooth type.

The bird repellent insulating plug comprises three parts: an insulator made of insulating material in cylindrical or prismatic shape where the wire is wound, and the insulator also has a cavity; a plate with two holes, the first hole being used for the passage of a fixing medium through the plate, the fixing medium being trapped inside the cavity of the insulator and a second hole for the passage of a second fixing medium for the fixing of the plate to the building.

The insulating plug is characterized by the fact that the insulator has a diameter between 15 and 45 millimeters, with an inner cavity filled with air, with a diameter of 10 to 40 millimeters and the fixing medium is made of a cylindrical metallic material of 2 to 8 millimeters in diameter.

The insulating plug is characterized by the fact that the insulator has a height of 30 to 150 millimeters, being provided with two recesses, a lower recess and an upper recess for the winding of the wire, being the wire passed through the lower recess or the upper recess.

The bird repellent inductive mesh comprises a plurality of insulating plugs fixed in buildings where a wire of conductive material is wound to the insulating plugs one by one, forming a plurality of coils connected in series, the insulating plugs being spaced in relation to their nearest neighboring insulating plug, connected in sequence by the wire at a distance of 0.3 to 4 meters, the preferred distance being 2 to 3 meters.

The inductive mesh is characterized by the fact that a single turn of the wire is performed around each insulating plug.

The inductive mesh is characterized by the fact that the insulating plug is spaced in relation to a closer insulating plug, not connected in the sequence by the wire, at a distance of more than 0.2 meters.

The inductive mesh is characterized by the fact that the wire forming the mesh is made of stainless steel, the wire diameter being from 0.45 to 2.0 mm and its resistivity from 0.0001 to 5 µΩm. Alternatively, the inductive mesh is characterized by being formed by an electroplastic wire or an electroplastic tape, with its thickness varying from 1.2 to 40 millimeters.

The inductive mesh is characterized by the fact that the wire forming the mesh is preferably made of stainless steel with a diameter of 0.6 mm and its resistivity preferably of 0.72 µΩm. The wire preferably has the following chemical composition: C % 0.030 max, Mn % 2.0 max, Si % 1.00 max, Cr % 17.00 to 20.00, Ni % 8.00 to 12.50, being austenitic structure steel. The austenitic stainless steels are the ones with the highest resistance to corrosion, in general terms, among the families of stainless steels, therefore, they are adequate to the present invention.

The inductive mesh is characterized by the fact that the wire is fixed to the insulating plug by means of a taper.

A method of installing the bird repellent inductive mesh, where the insulating plugs are fixed to a building by means of self-spinning screws, rivets, bush screws or any other means of fixing, wherein the wire is fixed to the first insulating plug with a clamp and follows to the next insulating plug passing the wire one turn around the insulating plug, then following to the next insulating plug passing the wire with one turn always wrapping the wire in the same direction in all the insulating plugs until the last insulating plug that is fixed with a clamp.

An inductive mesh installation method, where one or more springs connected to the wire are alternatively used in order to provide traction in the longitudinal direction.

DETAILED DESCRIPTION OF THE INVENTION

Figure 1:
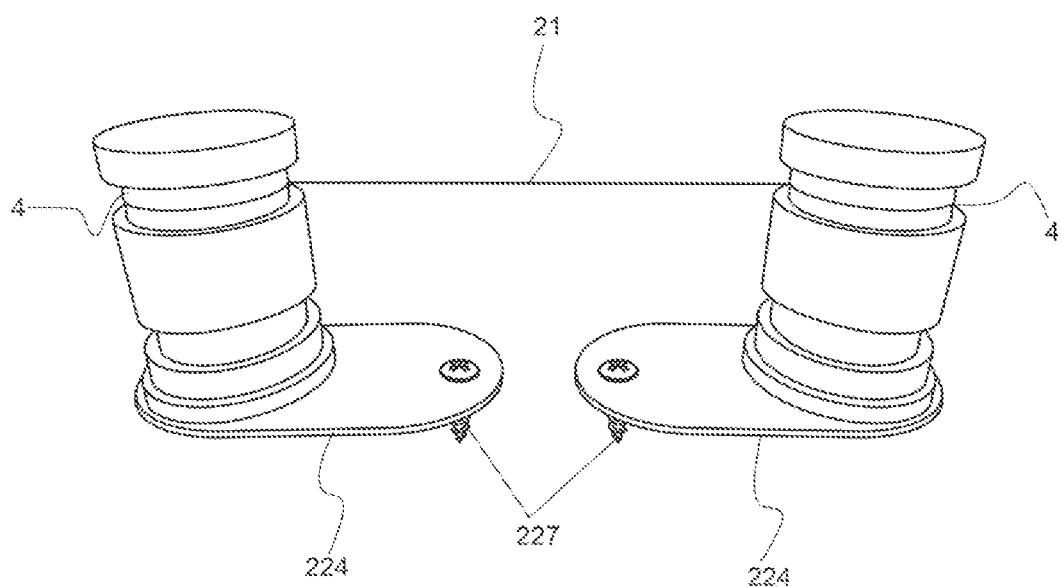
FIG. 1 shows two insulating plugs connected in sequence by the bird repellent mesh wire.
Figure 2:
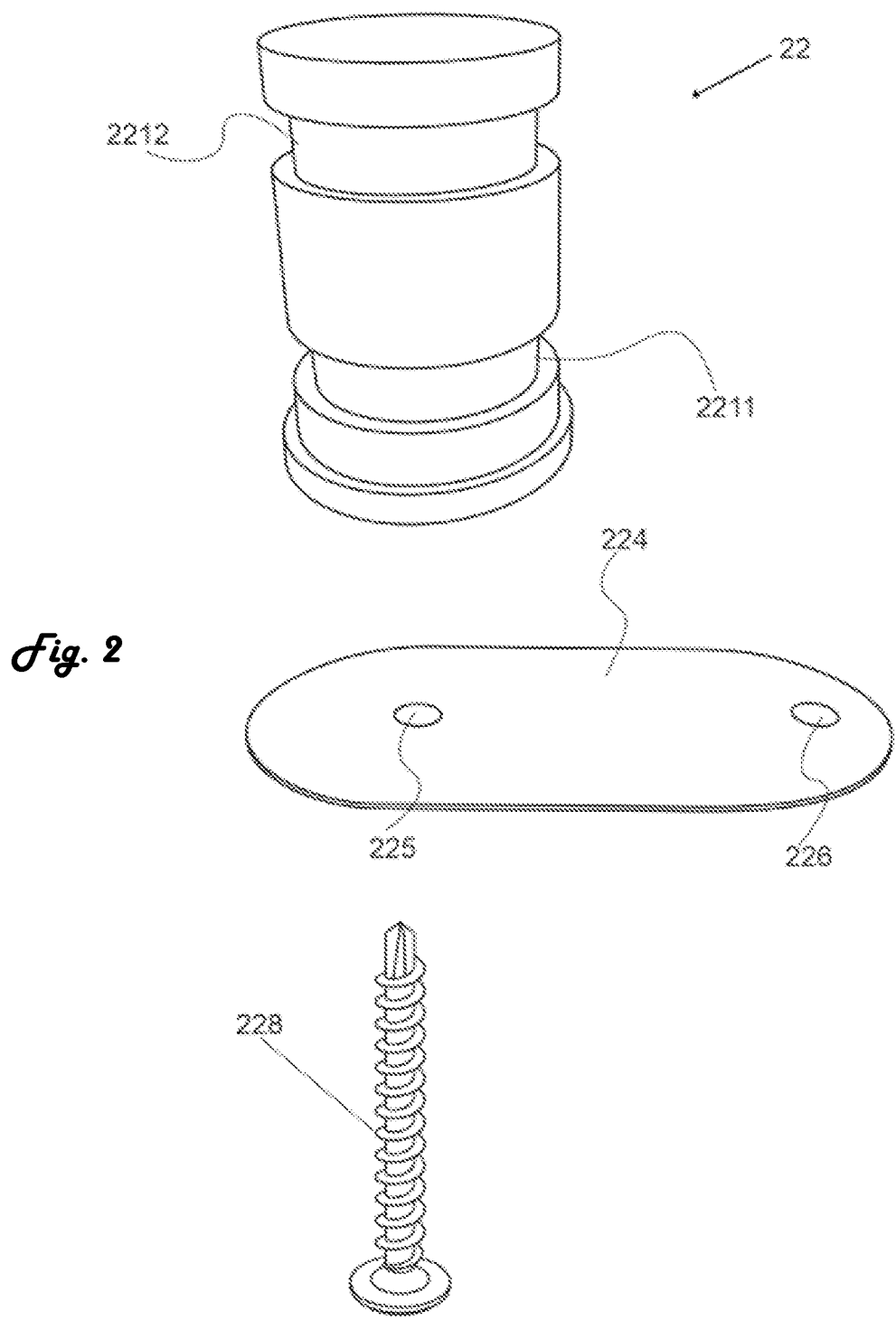
FIG. 2 shows an exploded view of the insulating plug assembly, with the fixing plate and the respective means of fixing the plate to the plug, which also serves as the core of the coil.
Figure 3:
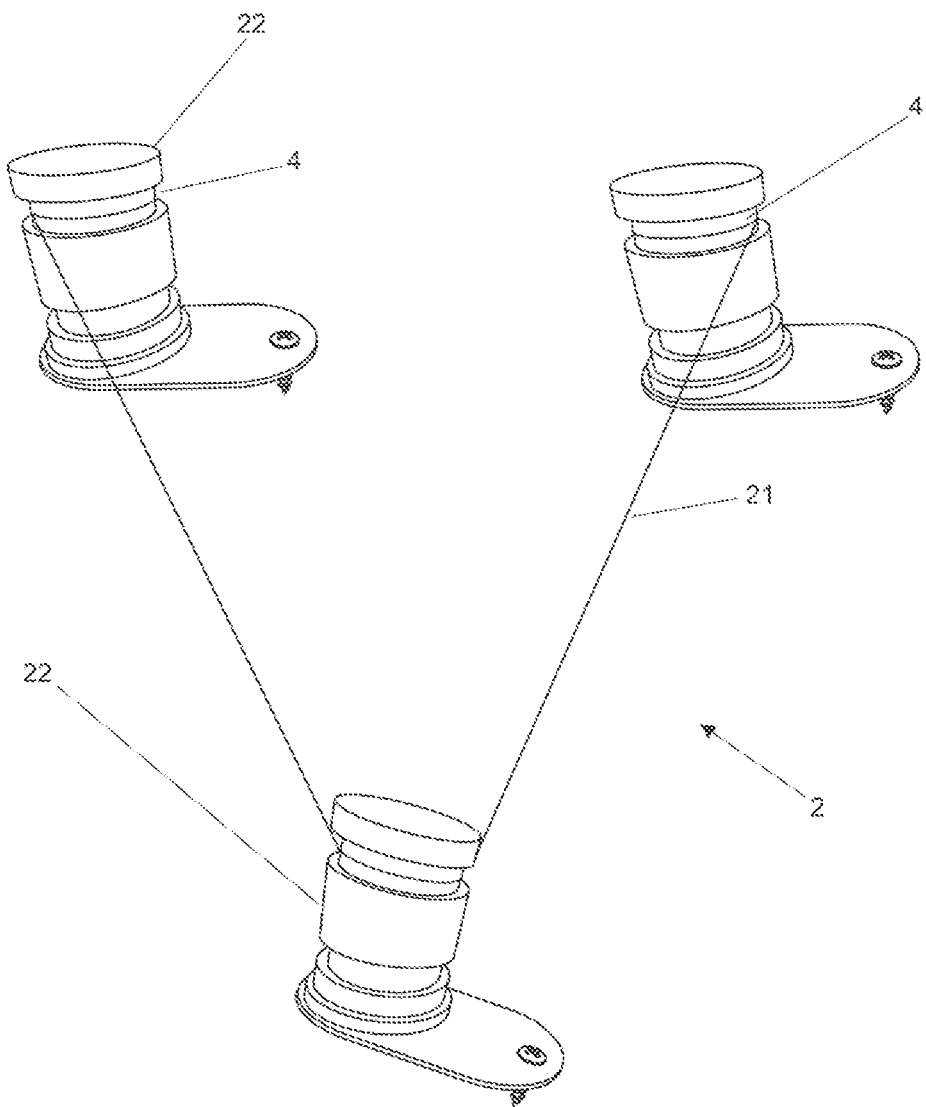
FIG. 3 shows a scheme of the mesh in its open form.
Figure 4:
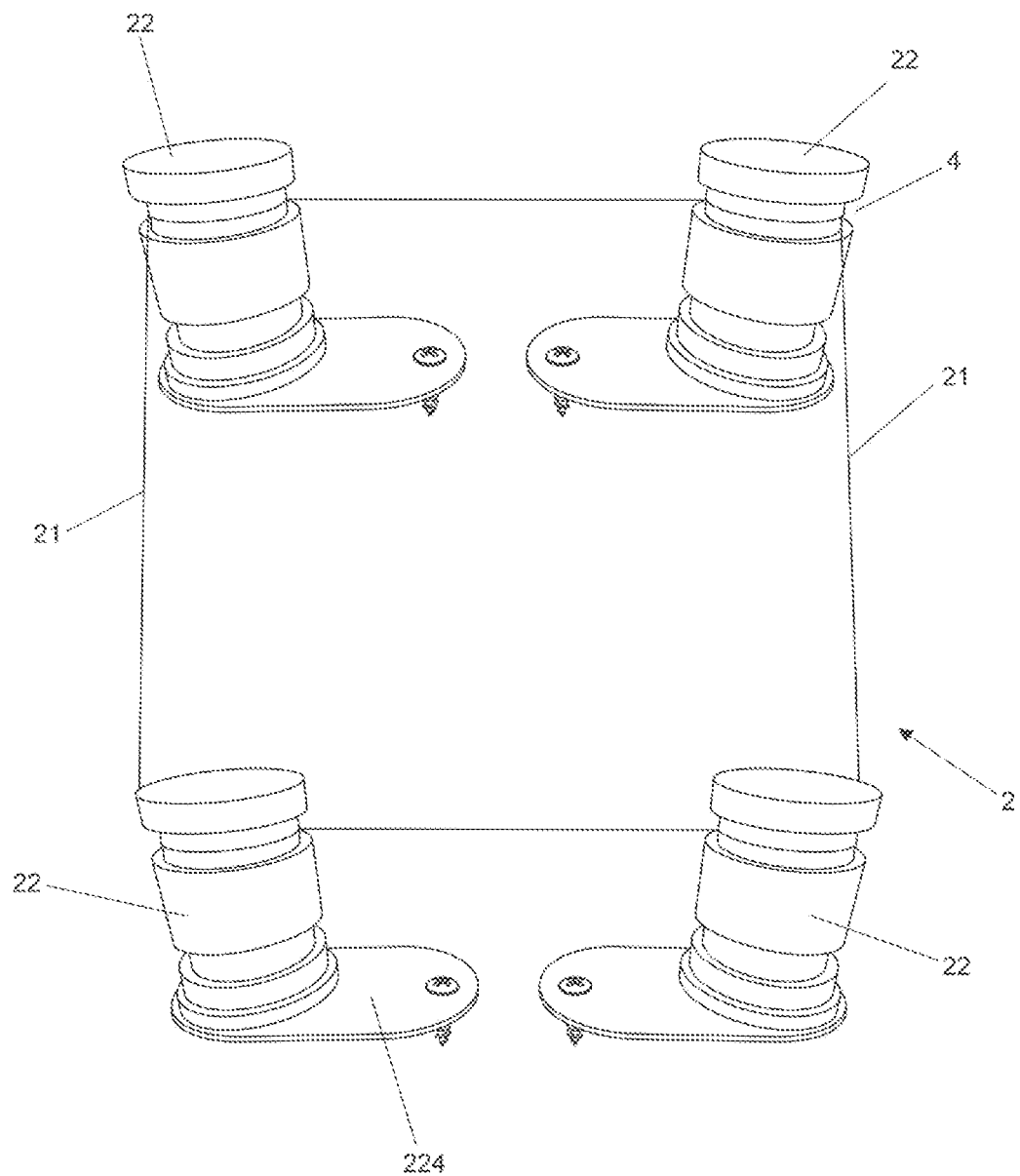
FIG. 4 shows a scheme of the mesh in its closed form.
Figure 5:
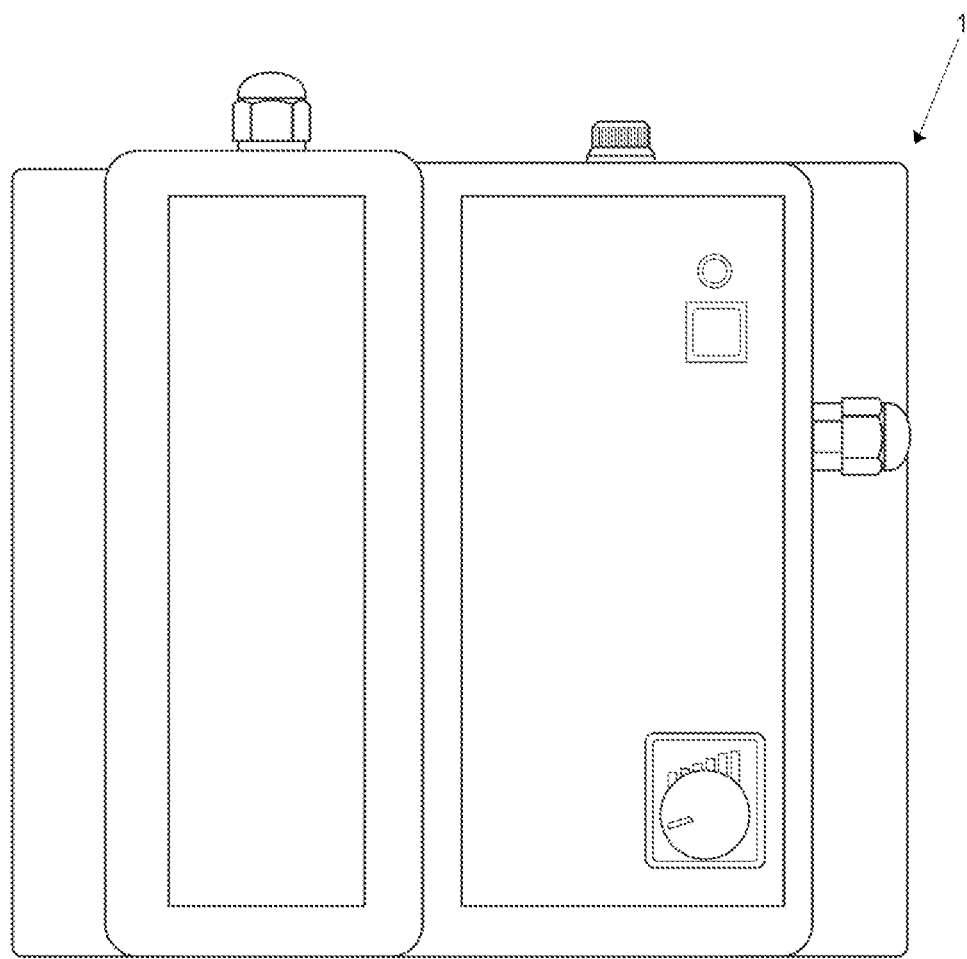
FIG. 5 shows an example of a pulse generator.

The system of repellence by sensorineural interaction through the formation of the electromagnetic field taught here has the function of keeping birds away from a given location. This system can be installed both in the external part of a building and in the internal part. In other words, the insulating plugs (22) can be installed inside a building or on an external portion of a building.

The term building adopted in this document should be interpreted as a man-made structure to support the installation of the mesh and functioning as a negative pole within the system. The inductive mesh (2) taught here can be installed in tiles, gutters, ruffs, walls, sills, balconies, ceilings, slabs, structural masonry, fences, among other components of a building.

The present system of bird repellence is equipped with a generator (1) of electromagnetic field. This electronic device is preferably connected to the mains, 110/220 volts and generates alternating electric pulses at its output. The electromagnetic field generator (1) is then connected to an inductive mesh (2) by means of a cable here called high insulation cable.

The mesh (2) inductor is formed by a wire (21) preferably made of stainless steel, the wire (21) being fixed to a plurality of insulating plugs (22).

The shape of the inductor mesh (2) is determined by the positioning of the plugs (22) fixed on a building.

The plugs (22) are fixed in a plurality of places in order to provide a variety of mesh geometries (2) suitable to the characteristics of the building where an electromagnetic field is generated. In this way, the mesh format (2) is conveniently chosen according to the architecture of each installation site, provided that the maximum and minimum distances between the plugs (22) isolators of the mesh (2) are respected.

For example, when the system needs to be mounted on roofs similar to residential roofs, the placement of the insulating plugs (22) follows the following exemplary arrangement: the insulating plugs (22) are fixed on the ridges, the rain gutters and the edges of the entire surrounding roof. When the installation is done on the walls of apartment buildings (vertical installation), the fixing of the insulating plugs (22) follow the following exemplary arrangement: the insulating plugs (22) are fixed on the top of all air conditioning or any structure that serves as support for birds. The aim is to avoid the balconies of buildings where the mesh (2) can be in contact with the human being.

Preferably, closed mesh (2) arrangements, that is, rectangular, circular or hexagonal shapes, are sought.

Open meshes in the form of a "C" or a "U" also work, however, they are not preferred forms because the electromagnetic field generated is less intense.

The electromagnetic field generated by the mesh (2) is intensified by winding the wire (21) around the body of the insulating plug (22), forming a coil (4) that induces the electromagnetic field, capable of repelling the birds in the vicinity of the mesh (2).

The coil (4) preferably consists of a single coil, that is, the wire is conveniently wound only once around the insulating plug (22) providing the proper magnetic field to keep the birds away from the mesh (2).

The wire (21) used is preferably made of stainless steel or electroplastic wire or electroplastic tape.

Many times, during the installation of the inductive mesh (2), it is not possible to leave the wire (21) completely stretched. When the wire (21) is not properly tensioned it runs the risk of touching the structure of the building, often occurring the grounding of the electrical pulse. The grounding of the pulse causes the system not to work properly. In order to seek the proper tensioning of the wire (21) and avoid its grounding, springs can be installed by connecting one end to the other of the wire (21) providing its correct stretching. Springs are mainly useful when the distance between the insulating plugs (22) is increased. However, their use may be dispensed with if the correct wire stretching (21) is achieved.

The pulse generator or reactor produces an alternating electrical signal at a frequency of 100 to 150 Hz with a voltage of 1,000 to 6,000 volts, preferably 4,000 volts peak-to-peak and $0.001 \times 10^{-3}$ to $0.01 \times 10^{-3}$ amperes, being the waveform generated the sawtooth type.

More specifically, the output voltage of the pulse generator is preferably 4,000 volts peak-to-peak and the electrical current is preferably $0.004 \times 10^{-3}$ amperes.

The consumption of the unit is approximately 15 watt/h and its operating frequency is preferably around 120 hertz. The internal resistance is 0.07% and the preferred wave type is sawtooth. The distribution shape is straight and its pulse alternate. The output characteristics of the pulse generator (1) are adequate to provide an electromagnetic field that repels the birds.

The insulating plug (22) comprises three parts: an insulator made up of insulating material in a preferably cylindrical shape where the wire is wound (21).

The format of the insulating plug (22) is preferably cylindrical, however, this cylindrical format should be interpreted here more broadly, as it can take other formats such as a prism or a cone. The cross section can be octagonal, hexagonal, square or even triangular. However, the prism with more sides is preferable. The cylinder is chosen as the preferred shape due to the greater practicality in manufacturing.

The insulating plug (22) also has a cavity, that is, the insulating plug (22) has an opening in the lower base, the opening being preferentially wide where a metallic fixation medium (228), such as a screw or rivet is fixed inside this cavity. The metallic fixation medium (228) is preferably fixed inside the upper base of the insulating plug (22).

The insulating plug (22) is also provided with a plate (224) with two holes, the first hole (225) for the passage of the metallic fixation medium (228) through the plate (224) and attached inside the cavity of the insulating plug (22), as explained in the previous paragraph, and a second hole (226) for the passage of a second fixing medium (227) for the attachment of the plate (224) to the building.

Preferably, the plate (224) is made of galvanized steel measuring 50 mm long by 32 mm wide, with two holes at each end.

The second fixing medium is preferably a self-drilling screw or rivet or screw with bush. The self-drilling screw is preferably used when the structure, where the insulating plug (22) will be assembled, is metal. On the other hand, bushings and screws are preferably used when it is fixed on masonry structures.

When the mesh (2) is installed inside the building, that is, when it needs to repel the birds inside the building, the insulating plugs (22) are fixed on metal structures, wooden beams, electro gutters, electro ducts, pipes of any nature, concrete beams or any other type of structure that serves as accommodation for the birds described here.

When the mesh (2) is installed externally, the insulating plug (22) is generally fixed on galvanized steel roof tiles, gutters, casings, ceramic roof tiles, fiber cement tiles, concrete slabs and on the structural masonry itself. The arrangement of the insulating plugs (22) in the mesh (2) with the distances taught here are important for the creation of the electromagnetic field suitable for chasing birds away.

The insulating plug (22) is manufactured by means of injection and the synthetic material preferably from the polyamide family. The insulator has a diameter between 15 and 45 millimeters, with an inner cavity filled with air, with a diameter of 10 to 40 millimeters and the fixing medium is made of a metallic material preferably cylindrical from 2 to 8 millimeters in diameter. Even more preferable, the fixing medium of the plate (224) to the insulator (22) is a chip screw measuring 4 millimeters in diameter and 50 millimeters in height.

The metallic fixation medium (228) helps in the correct induction of an electromagnetic field capable of keeping the birds away, as it works as a coil core (4).

The insulating plug is preferably 30 to 150 millimeters high, being provided with two recesses, a lower recess (2211) and an upper recess (2212) for the winding of the wire (21), being the wire passed through the lower recess (2211) or the upper recess (2212). The two recesses have an important function in the installation of the mesh (2). Preferably the lower recess is used to wrap the wire (21), however, in some cases it is necessary to deviate from some irregularity in the structure, that is, to deviate from some obstacle that may touch the wire (21) and even produce its grounding. Thus, the upper recess has been conveniently designed for the realization of these necessary deviations.

The insulating plug (22) is even more preferable with a height of 50 mm.

The bird repellent inductive mesh (2) comprises a plurality of insulating plugs (22) fixed in buildings where a wire (21) of conductive material is wound to the insulating plugs (22) one by one. Thus, the mesh (2) is formed by a plurality of coils (4) connected in series, being the insulating plugs (22) spaced in relation to their nearest neighboring insulating plug (22), connected in sequence by the wire (21), at a distance of 0.3 to 4 meters.

Preferably, the insulating plugs (22) are spaced in relation to their nearest neighboring insulating plug (22), connected in sequence by the wire (21), at a preferential distance of 2 to 3 meters, where the best results are achieved.

In the inductive mesh (2), the insulating plug (22) must be spaced in relation to a neighboring insulating plug (22), not connected in the sequence by the wire (21), at more than 0.2 meter and, preferably, less than 4 meters. That is, an insulating plug (22) that is not the neighbor connected immediately by the wire, for example, a "U" shaped mesh the plugs (22) of the open end of the "U" should be separated at a distance greater than 0.2 meter and at most 4 meters.

It should be noted that the mesh (2) can assume a diversity of configurations, which can be an open mesh in "C" or "U" shape or preferably a closed mesh in the shape of a rectangle or in a circular shape. However, regardless of the shape of the mesh (2), which is adapted according to the availability of the building, the spacing between the adjacent plugs (22) connected in sequence by the wire (21) must be respected. Likewise, that the minimum distance between insulating plugs (22) not connected in the wire sequence must also be respected in order to obtain the desired results.

Preferably, a single turn of the wire (21) is performed around each insulating plug (22), the coil (4) with a spiral brings the best results for the induction of the electromagnetic field that keeps the birds away.

The wire (21) forming the mesh (2) can be stainless steel or electroplastic wire or electroplastic tape, the diameter of the wire (21) being of stainless steel from 0.45 to 2.0 millimeters and its resistivity from 0.0001 to 5 µΩm. Preferably, the wire (21) mesh former (2) is made of stainless steel with a diameter of 0.6 mm and its resistivity of 0.72 µΩm.

The wires (21) are attached to the insulating plugs (22) through a yellow rail and in the sequence goes through all the other insulating plugs (22) installed in the building.

The present invention also teaches a method of installing the bird repellent inductive mesh. To assemble the mesh (2) the insulating plugs (22) are fixed in any building or towers or by means of self-drilling screws or rivets or screws with bush or any means of fixation, the minimum and maximum distance between them must be respected.

The wire (21) is then fixed to the first insulating plug (22), preferably with a single turn, and fixed with a clamp. The wire (21) then goes to the next insulating plug (22), passing the wire (21), again preferably a single loop around the insulating plug (22). It then goes on to the next insulating plug (22) passing the wire (21) with one turn always wrapping the wire (21) in the same direction in all the insulating plugs (22) until the last insulating plug (22) that is fixed with a clamp.

The winding direction of the wire (21) over the insulating plugs (22) must always be carried out in the same direction in order to create the electromagnetic field with the same polarity and direction of the field in all the insulating plugs (22) of the mesh (2).

The number of plugs (22) will depend on the area to repel the birds, the larger the area the more insulating plugs (22) will be needed. Depending on the size of the area it may be necessary to install more than one system, i.e. one or more pulse generators (1) may be required. The generators cannot be connected in the same magnetic mesh (2). That is, each generator (1) is responsible for feeding its respective magnetic mesh (2). Each generator (1) feeds a mesh (2) of approximately 100 to 600 meters of linear wire, preferably 300 meters. Besides that, the systems must have generators (1) with identical pulses and have the mesh (2) mounted in a similar way, always respecting the direction in the coil winding (4).

During installation, many times it is convenient to use one or more springs connected to the wire (21) in order to provide traction in the longitudinal direction keeping the wire (21) stretched. The traction on the wire is convenient so that it does not touch any structure and may even provide grounding.

After all the mesh (2) is properly installed, that is, after the wires (21) are passed through all the insulating plugs (22), fixed and stretched, the mesh (2) is ready for use. Therefore, to connect the system just connect the high isolation cable of the generator output (1) of pulses to the mesh (2) inductor to generate the electromagnetic field.

When connecting the pulse generator (1) to the electrical grid, it will provide the movement of electrons responsible for generating the electromagnetic pulses throughout the wire mesh (2) installed in the building.

The pulse generator (1) only supplies positive pulses, being the building (place that is being installed) the negative pole. As the positive pulses seek the negative pole, in this system, the very building where the mesh (2) is being installed contributes to the formation of the electromagnetic field. These electromagnetic waves generated by an alternating current form an oscillating magnetic field.

The formation of the electromagnetic field, which generates a nuisance for the birds, avoids their re-approximation, thus preventing the formation of nests, dirt on walls and structures. This brings benefits such as building conservation, preservation of the heritage, savings in maintenance, sanitary working conditions and microbiological safety for employees who perform their tasks on the site previously affected by the birds.

Therefore, the electromagnetic field created avoids the birds landing on the site and later nesting them, moreover, the system taught here does not cause visual pollution in the environment.

The electromagnetic system taught here advantageously does not interfere in any other electronic circuit, such as WI-FI, PLC, radiofrequency transmitters and receivers, cell phones, among others.

Particularly in urban pest control, there is the concept of "shelter", "water", "food" and "access".

The present system aims to eliminate the shelter, preventing the formation of new nests and the access, preventing the rise of birds in structures that they use as perches to observe the possibility of getting food.

The electromagnetic field created by the mesh (2) interacts with the iron crystals present in the birds' beaks, which are connected to their central nervous system, generating a neurosensorial interaction between the present system and the birds. This sensorineural interaction causes a positional disturbance in the birds' navigation system, causing them to gradually move away from the site.

The invention claimed is:

1. A bird repellent system comprising:
   an electronic device alternating electrical positive pulse generator that is electrically connected to a mesh formed by a wire, wherein:
   the wire is made of stainless steel,
   a diameter of the wire being from 0.45 to 2 millimeters,
   a resistivity of the wire is from 0.0001 to 5 $\mu\Omega m$,
   the wire is fixed to a plurality of insulating plugs,
   a shape of the mesh is determined by the positioning of the plurality of insulating plugs installed in a building, wherein the building works as a negative pole,
   the plurality of insulating plugs are installed in a plurality of places in order to provide a variety of mesh geometries,
   the pulse generator produces an alternating electrical positive signal,
   the alternating electrical positive signal having:
   a frequency of 100 to 150 Hz,
   a voltage of 1,000 to 6,000 volts,
   a current of $0.001 \times 10^{-3}$ to $0.01 \times 10^{-3}$ amperes,
   and being a sawtooth waveform,
   an electromagnetic field is generated by the mesh,
   the electromagnetic field generated by the mesh is intensified by winding the wire around bodies of the plurality of insulating plug forming a coil that induces the electromagnetic field capable of repelling the birds in the vicinity of the mesh,
   the electromagnetic field interacts with the iron crystals present in the beaks of the birds, affecting the neurosensory system of the birds causing repellency.

2. The bird repellent system, according to claim 1, wherein the coil consists of a single coil.

3. The bird repellent system, according to claim 1, wherein the geometry of the mesh is closed.

4. The bird repellent system, according to claim 1, wherein the plurality of insulating plugs comprise three parts:
   an insulator made up of insulating material in cylindrical or prismatic form where the wire is wound, and the insulator also has a cavity;
   a metallic fixation medium and
   a plate with two holes;
   the first hole for the passage of the metallic fixation medium through the plate and a second hole for the passage of a second fixing medium for fixing the plate to the building; the metallic fixation medium being trapped inside the cavity of the insulating plug.

5. The bird repellent system, according to claim 4, wherein the plurality of insulating plug have a diameter between 15 and 45 millimeters, having the cavity filled with air, with a diameter of 10 to 40 millimeters and the metallic fixation medium is substantially cylindrical from 2 to 8 millimeters in diameter.

6. The bird repellent system, according to claim 4, wherein the plurality of insulator plug have a height of 30 to 150 millimeters, being provided with two recesses, a lower recess and an upper recess for the winding of the wire, being the wire passed through the lower recess or the upper recess.

7. The bird repellent system, according to claim 1, wherein the mesh comprises the plurality of insulating plugs installed on the building where the wire of conductive material is wound to the plurality of insulating plugs one by one, forming a plurality of coils connected in series, being any of the plurality of insulating plugs spaced from its nearest neighbor, connected in sequence by the wire, at a distance of 0.3 to 4.0 meters.

8. The bird repellent system, according to claim 7, wherein any of the plurality of insulating plugs is spaced from its nearest neighbor, connected in sequence by the wire, at a preferential distance of 2 to 3 meters.

9. The bird repellent system, according to claim 7, wherein any of the plurality of insulating plugs is spaced from its nearest neighbor, not connected in the sequence by the wire, at a distance of 0.2 to 4 meters.

10. The bird repellent system, according to claim 1, wherein the wire forming the mesh is made of stainless steel with a diameter of 0.6 mm and a resistivity of 0.72 µΩm.

* * * * *

UNITED STATES PATENT AND TRADEMARK OFFICE
CERTIFICATE OF CORRECTION

Page 1 of 1

PATENT NO. : 12,382,949 B2
APPLICATION NO. : 17/053916
DATED : August 12, 2025
INVENTOR(S) : Cleber da Cruz Garcia et al.

It is certified that error appears in the above-identified patent and that said Letters Patent is hereby corrected as shown below:

In the Claims

Column 10, Line 43, delete "plug" and insert --plugs--

Column 10, Line 44, delete "the birds" and insert --birds--

Column 10, Line 47, delete "in the beaks" and insert --in beaks--

Signed and Sealed this
Eleventh Day of November, 2025

John A. Squires
*Director of the United States Patent and Trademark Office*